June 6, 1944.                J. HARDING, JR                    2,350,352
                      AERONAUTICAL FUEL CONTROL VALVE
                 Filed Nov. 8, 1941                2 Sheets-Sheet 1
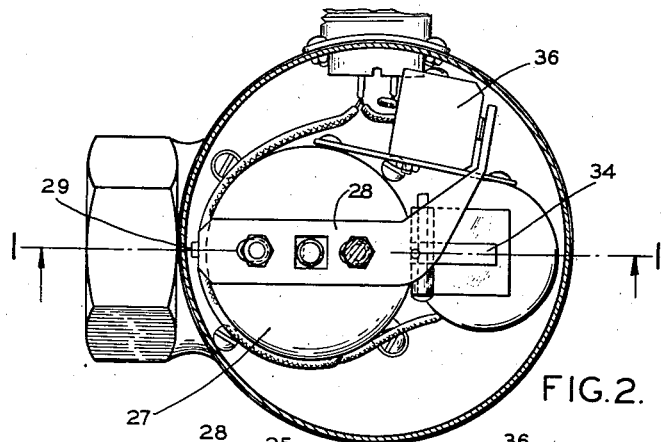
FIG.2.
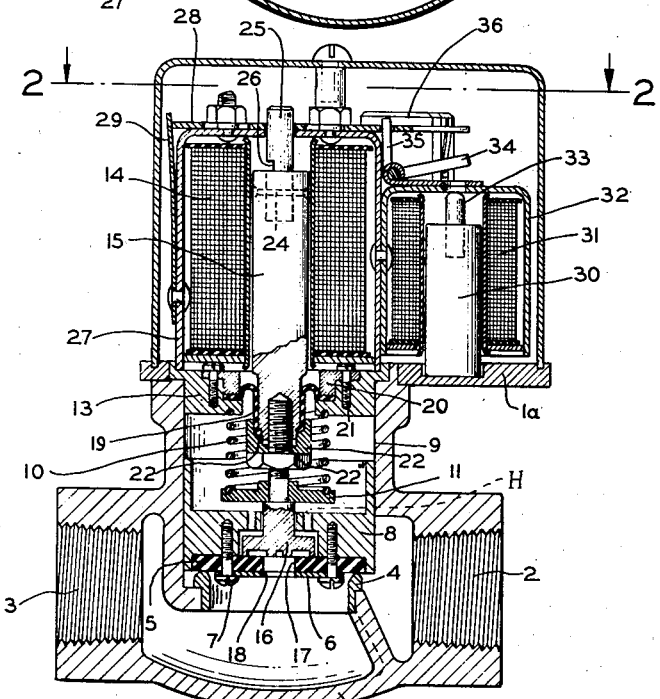
FIG.1.
FIG.6.
INVENTOR.
JOHN HARDING JR.
BY
ATTORNEYS.

June 6, 1944.　　　J. HARDING, JR　　　2,350,352
AERONAUTICAL FUEL CONTROL VALVE
Filed Nov. 8, 1941　　　2 Sheets-Sheet 2
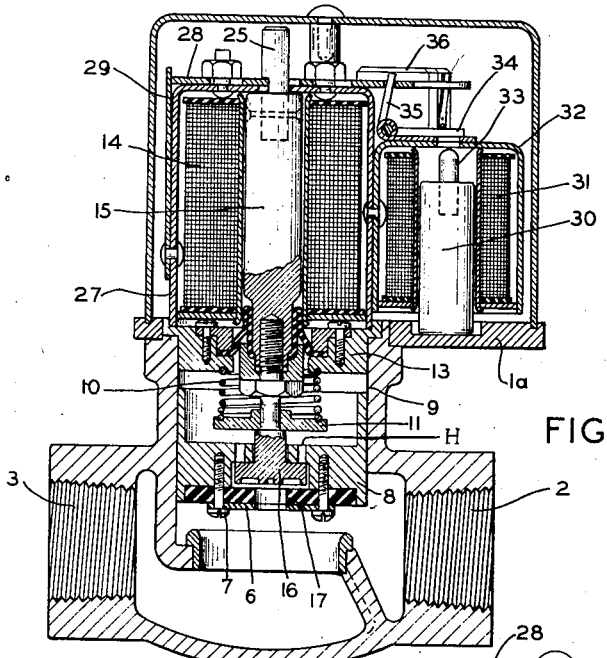
FIG.3.
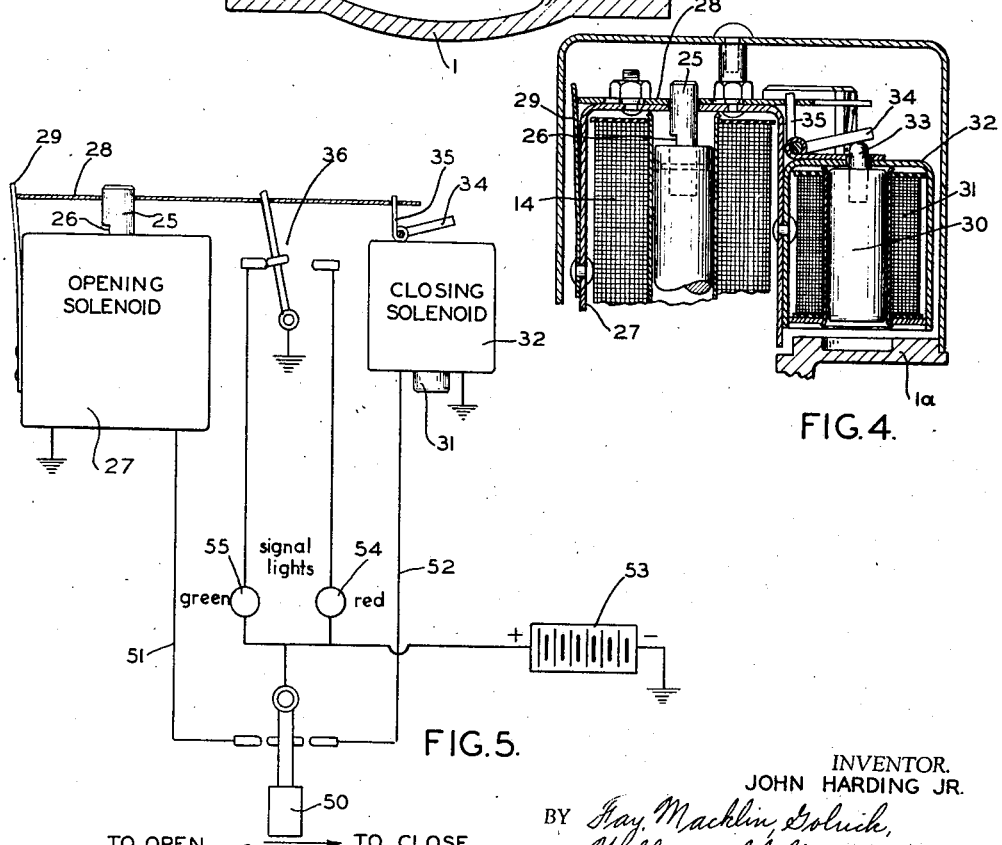
FIG.4.
FIG.5.
TO OPEN ←——→ TO CLOSE
INVENTOR.
JOHN HARDING JR.
BY
ATTORNEYS.

Patented June 6, 1944

2,350,352

UNITED STATES PATENT OFFICE 2,350,352

AERONAUTICAL FUEL CONTROL VALVE

John Harding, Jr., Shaker Heights, Ohio

Application November 8, 1941, Serial No. 418,431

2 Claims. (Cl. 137—139)

This invention relates to valves, but has reference more particularly to an electromagnetically actuated valve especially designed for controlling the flow of fuel, air, or oil in aircraft.

In the handling of fuel, particularly in multi-engine aircraft, numerous considerations are present, paramount of which is that of safety. It has been common practice to employ conventional disc, cone or poppet type valves operable remotely and manually by means of torque shafts, push-pull devices, bell cranks, cables, pulleys, guides or the like required between the pilot and/or engineer's compartment and the valves. With the advent of the larger multi-engine machines the installation of efficient and satisfactory control means for fuel shut-off or distributor valves has introduced definite hazards, especially in military aircraft. Further, the design of rigid, manually operated controls to obtain (guarantee) proper indexing and torque requirements occasioned by increased fuel line pressures is a factor requiring careful consideration from the weight and cost standpoint. Moreover, unless a single shut-off valve is employed adjacent to each fuel tank outlet—necessitating one of the aforementioned types of controls to each—the lengths of fuel pipings between the tanks and valves may be classified as fire hazards due to their vulnerability to machine gun fire in military aircraft.

The primary object of this invention is to provide a valve of the character described herein which will minimize to the greatest extent the aforementioned conditions. A further object of this invention is not only to provide a simple, light weight and high efficient valve assembly with a single inlet and single outlet port, but also a valve assembly of the same basic design in which a plurality of inlet and/or outlet ports are provided in a single housing. This latter design will simplify certain fuel system installations where vulnerability is not a factor for consideration.

Another object of the invention is to provide a valve of the character described, the operation of which completely eliminates the use of manually operated controls, other than a simple light weight momentary contact, double pole switch, which may be mounted in a position readily accessible to the pilot, co-pilot, and/or delegated flight crew members.

Another object of the invention is to provide a valve which has incorporated therein solenoids for closing as well as opening the valve, as well as mechanism for locking the valve in open position.

Another object of the invention is to provide a valve incorporating means for readily altering the relative position of the actuating and locking assembly in relationship to the valve body ports. This is to simplify and minimize interference problems during installation.

A further object of the invention is to provide a valve of the character described which has incorporated therein means for effectively sealing the solenoids and electrical connections of the valve from the corrosive and other effects of the fuel or other liquid which flows through the valve.

Other objects and advantages of the invention will be apparent during the course of the following description.

In the accompanying drawings forming a part of this specification, and in which like numerals are employed to designate like parts through the same, Fig. 1 is a vertical cross-sectional view of the valve taken on the line 1—1 of Fig. 2 and showing the valve in closed condition;

Fig. 2 is a horizontal cross-sectional view of the valve, taken on the line 2—2 of Fig. 1;

Fig. 3 is a view similar to Fig. 2, but showing the valve in open condition;

Fig. 4 is a fragmentary view, similar to Fig. 3, but showing the position of the parts immediately after closing the valve;

Fig. 5 is a wiring diagram, illustrating the use of the valve; and

Fig. 6 is a fragmentary view, similar to Fig. 1, but showing a modified form of valve.

Referring to the drawings in detail, and more particularly Figs. 1 to 5 inclusive, the valve is seen to comprise a casing or body 1 having internally threaded ends 2 and 3 which permit the connection of the valve to inlet and outlet conduits respectively. The valve is provided with a removable metallic seat 4 upon which a valve proper in the form of a disc 5, preferably formed of synthetic rubber or like oil and gasoline resistant material, is adapted to seat. Instead of a rubber disc, a metallic poppet valve may be employed.

The valve 5 is secured, as by means of a metallic washer 6 and screws 7, to a piston 8 mounted for reciprocal movement in an enlarged vertically extending bore 9 of the valve.

The valve 5 is adapted to be maintained in closed position by a coil spring 10 and by the presvary from zero to any predetermined design pressure, the spring 10 assisting movement of the valve to the closed position after it has been unlocked from the open position to be presently described. The coil spring 10 is interposed between supporting disc 11, which disc rests on a shoulder provided on the stem of an auxiliary valve 16, and a stationary member 13 supported upon the valve body at the upper end of the bore 9.

The member 13 provides a support for the "opening" solenoid 14, through which a plunger 15, preferably formed of soft iron or similar material of high electrical permeability extends. The plunger 15 has removably secured to the lower end thereof the auxiliary valve 16, the effective area of which is slightly greater than the combined effective area of plunger 15 and a sealing member 19. This auxiliary valve is employed to close an opening 17 in the center of the valve 5, which opening is in alignment with an opening 18 in the center of the washer 6. Valve 16 also prevents the pressure—as, and when existing—in the space between member 13 and piston 8 from forcing plunger 15 upward, thereby causing leakage through valve 5.

For the purpose of sealing the solenoid and plunger 15 from the fuel within the valve, an annular flexible sealing member 19 of synthetic rubber or the like, is interposed between the stationary member 13 and the lower end of the plunger, the outer edge of the member 19 being secured to the member 13 by means of a gland 20, secured to the member 13 by means of screws 21, and the inner edge of the member 19 being secured to the plunger 15 by means of a gland 22 which is interposed and secured between the plunger and a lock nut 22" on the stem of the auxiliary valve 16. A lock washer (not shown) may be interposed between the gland 22 and nut 22". As a result of this construction, the fuel which forces its way through the predetermined clearance between the wall of piston 8 and bore 9 of the valve, is prevented from passing upwardly through the member 13 and thereby adversely affecting the operation of the solenoid or the electrical connections to the latter, while at the same time, the flexibility of the member 19 permits movement of the plunger 15 between the extreme positions shown in Figs. 1 and 3, without unduly straining such member. The four bleeder holes H in piston 8 permit rapid escape of fuel trapped above piston 8 through openings 17 and 18 during the "opening" cycle.

Secured to the upper end of the plunger 15, as by means of a pin 24, is a head 25 having a notch or recess 26 therein, said head extending upwardly through the solenoid housing 27 and a detent 28 slidable transversely on the solenoid housing. The detent 28 is engaged at one end by means of a flat spring 29 which normally urges the detent towards the right as viewed in Fig. 1, so that when the head 25 of the plunger has been elevated to the position shown in Fig. 3, the detent enters the slot 26 and locks the plunger 15 in elevated position with the valve 5 in the fully open position.

The valve body 1 is provided at its upper end with a horizontally extending, removable and rotatable ledge portion 1a which provides a support for the plunger 30 of a closing solenoid 31 housed within a casing 32 secured to the casing 27. The plunger 30 is provided at its upper end with a head 33, which when elevated to the position shown in Fig. 4, engages one arm 34 of a bell-crank lever, the other arm 35 of which extends through the detent 28. The rotatable feature permits revolving the complete solenoid assembly's microswitch and connector, to be hereinafter referred to, to any one of four positions thereby effecting simplification for installation purposes.

The valve further includes a small single pole double-throw microswitch 36, which is mounted on the ledge 1a of the valve body, and the function of which will hereinafter appear.

In order to more clearly understand the operation of the valve, reference should be made to the wiring diagram of Fig. 5, wherein the parts of the valve which have already been described are designated by like reference characters, but in which certain other elements not heretofore described may be noted as follows:

In order to control the operation of the valve, a control switch 50 of the momentary contact, single pole, double-throw type is provided, preferably within easy reach of the pilot, co-pilot, or his designated assistant, such switch being connected to the opening solenoid 14 by means of a wire 51 and with the closing solenoid 31 by means of a wire 52. Current for the operation of the solenoids is provided by a battery 53, and in order to visually indicate to the pilot or other operator whether the valve is open or closed, red and green signal lights 54 and 55 respectively are mounted on the instrument panel, and are energized by the microswitch 36 in a manner to be now described.

Assuming that the valve is closed, that is, that the various parts are in the position shown in Fig. 1, and that it is desired to open the valve, the switch 50 is moved from its normal neutral position towards the left, as seen in Fig. 5, and momentarily held in this position until the opening cycle is complete. Removal of the hand from the switch lever permits it to return to its "off" or neutral position. This energizes the opening solenoid 14, causing the auxiliary valve 16 to be lifted to uncover the openings 17 and 18, permitting any fuel which is trapped in the bore 9 of the valve to flow through such openings and into the space below the valve 5. This equalizes the pressure above and below piston 8 so that the solenoid 14 does not have to move the piston 8 against the downward or inlet pressure of the fuel which, in certain aeroplane fuel system installations, amounts to 20 to 25 pounds per square inch. After the pressure is thus equalized, the auxiliary valve comes into engagement with the piston 8 so that continued upward movement of the plunger 15 causes the valve 5 to be moved to the fully open position shown in Fig. 3. Since this movement requires only that the relatively light piston 8 be moved against gravity plus the light pressure (about 1 pound) of the spring 10, the pull exerted by the solenoid need not be excessive, and in actual practice, a pull of only about 2 pounds has been found satisfactory. It is to be noted, in passing, that very little electrical energy is required to open the auxiliary valve 16, since the effective area of this valve is only slightly greater than the combined effective area of the rubber seal 19 and the plunger 15. This hydraulically balanced arrangement effects a considerable weight savings in permitting the use of small solenoids and conserves electrical energy.

When the valve 5 has thus been fully opened, the spring 29 becomes effective to force the detent 28 to the right, as shown in Fig. 3, causing it to enter the notch or recess 26 in the head, thereby maintaining the valve 5 in such fully open position against the pressure of the spring 10. No electrical energy is required to maintain the valve in the open position.

The aforesaid movement of detent 28 forces the bell crank lever 34—35 to move to the position shown in Fig. 3, in which position, it is ready for actuation by the closing solenoid plunger. At the same time, the microswitch 36 is actuated by the detent 28 to close the circuit containing the red signal light 54, thereby indicating to the pilot that the valve is open, this light continuing to remain lighted as long as the valve is open.

In order to close the valve 5, it is only necessary for the pilot to move the switch 50 from its normal neutral position to the right, as viewed in Fig. 5, thereby energizing the solenoid 31. Energization of the solenoid 31 causes the plunger 30 to be elevated to the position shown in Fig. 4, the head 33 in its movement to this position striking the arm 34 of the bell-crank lever causing the arm 35 of such lever to move the detent 28 to the left, as viewed in Fig. 4, against the action of the spring 29. This causes the detent to release the head 25, permitting the spring 10 to move both the valve 5 and auxiliary valve 16 to closed position, as shown in Fig. 1.

The aforesaid movement of the detent 28 to the left causes the microswitch 36 to be moved to the position shown in Fig. 5, thereby opening the circuit to the "red" signal light 54 and closing the circuit containing the "green" signal light 55, and thereby indicating to the pilot that the valve is closed, the green light continuing to remain lighted as long as the valve is closed.

By mounting the valve on or closely adjacent to the fuel tanks which each valve is designated to control, a quick and efficient shut-off is provided, thereby permitting the conduits leading from the shut-off tanks to remain at zero fuel pressure until the valve is opened. Further by shutting off the fuel flow through the conduits at or adjacent to the tanks, hazards of fuel loss and fire are minimized in case of breakage or rupture of the conduits leading from the respective tanks.

Referring to Fig. 5, it is again desired to point out that the switch 50 is of the momentary contact type which automatically returns to neutral position upon release thereof. Accordingly, assurance is had that the circuits to the solenoids will be dead whenever the valve is in the open or closed condition, thereby further minimizing the fire hazard and completely eliminating any draw on the electrical power supply of the aircraft.

Referring to Fig. 6, the auxiliary valve in this case is of somewhat different form than that shown in Fig. 1, comprising a disc 16' provided with a tapered edge which seats directly on the edge of an opening 17' in a valve 5'. For the purpose of sealing the solenoid chamber from the valve chamber, a Sylphon bellows 100 is interposed between a disc 101 secured to the member 13' and a supporting disc 111, through which the stem of the auxiliary valve passes.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. In a valve having a body portion provided with an inlet and an outlet, a valve seat in said body defining an opening providing connection between the inlet and outlet, said body having a bore therein, a closure for said bore fixedly secured to said body portion having an opening therein, a valve normally urged to closed position in said bore and having a stem extending through said opening, a seal operably connecting said stem and closure member to form a closed chamber behind said valve, a ledge rotatable relative to said closure member about the axis of the valve stem and constituting one wall of a casing provided with side and top walls, a solenoid in said casing for opening said valve, latch mechanism in said casing for holding said valve in open position, and a latch releasing solenoid in said casing, said casing having an inlet in the side thereof for entrance of electric wires to the solenoids whereby said casing with its solenoids and latch mechanism may be rotated to position the casing inlet in various positions without disturbing the seal between the valve stem and body portion.

2. In a valve having a body portion provided with an inlet and an outlet, a valve seat in said body defining an opening providing connection between the inlet and outlet, said body having a bore therein, a closure for said bore fixedly secured to said body portion having an opening therein, a valve normally urged to closed position in said bore and having a stem extending through said opening, a seal operably connecting said stem and closure member to form a closed chamber behind said valve, a ledge rotatable relative to said closure member about the axis of the valve stem and constituting one wall of a casing provided with side and top walls, a solenoid in said casing for opening said valve including a plunger, a latch carried by said solenoid and engaging said plunger to retain the valve in open position, a latch releasing solenoid in said casing provided with a plunger, a member engaging said latch and having a portion lying in the path of movement of the last named plunger and engageable thereby to project the latch to valve releasing position, said casing having an inlet in the side thereof for entrance of wires to said solenoids whereby said casing with its solenoids and latch mechanism may be rotated to position the casing inlet in various positions without disturbing the seal between the valve stem and body portion.

JOHN HARDING, Jr.